United States Patent

[11] 3,539,166

| [72] | Inventor | Lyndle G. Gheen |
| --- | --- | --- |
| | | Eugene, Oregon |
| [21] | Appl. No. | 783,248 |
| [22] | Filed | Dec. 12, 1968 |
| [45] | Patented | Nov. 10, 1970 |
| [73] | Assignee | R.H. Pierce Manufacturing Company |
| | | Eugene, Oregon |
| | | a corporation of Oregon |

[54] IRRIGATION COUPLING STRUCTURE
6 Claims, 3 Drawing Figs.

[52] U.S. Cl. .................................................. 285/5,
29/474.4, 285/21, 285/174, 285/330
[51] Int. Cl. ........................................... F16l 55/00,
F16l 25/00
[50] Field of Search.......................................... 285/5, 21,
260, 330, 345, 349, 416, 423(Mastic gasket), 374, 24,
330, 27, 174, 291 (O-ring); 29/474.4;
277/207(A)

[56] References Cited
UNITED STATES PATENTS

| 2,016,262 | 10/1935 | Arey et al. ..................... | 285/330 |
| --- | --- | --- | --- |
| 2,245,101 | 6/1941 | Cole ............................... | 285/174 |
| 2,271,777 | 2/1942 | Nathan........................... | 285/374X |
| 2,366,067 | 12/1944 | Smith ............................ | 285/260X |
| 2,776,151 | 1/1957 | Harkenrider.................. | 205/423X |
| 2,933,428 | 4/1960 | Mueller......................... | 285/21X |
| 3,197,216 | 7/1965 | Jackson......................... | 285/330X |
| 3,201,136 | 8/1965 | Harrison et al. .............. | 285/291X |
| 3,266,821 | 8/1966 | Safford......................... | 285/55X |
| 3,406,988 | 10/1968 | Jones.............................. | 285/24 |
| 3,434,745 | 3/1969 | Jackman ....................... | 285/423X |

FOREIGN PATENTS

| 216,207 | 8/1950 | Australia...................... | 285/5 |
| --- | --- | --- | --- |

Primary Examiner—Dave W. Arola
Attorney—Buckhorn, Blore, Klarquist and Sparkman

ABSTRACT: A polyvinyl pipe is secured and sealed to a coupling in the field by inserting a flexible polyurethane sleeve into an annular groove in a coupling with a keying pin in the coupling projecting into a keying slot in the sleeve. The pipe and sleeve are then bonded together by a solvent cement. The coupling includes a male member having a splining plate projecting into a slot in a female member. A latching plate on the splining plate engages a flange on the female member to connect the members for tension.

Patented Nov. 10, 1970
3,539,166
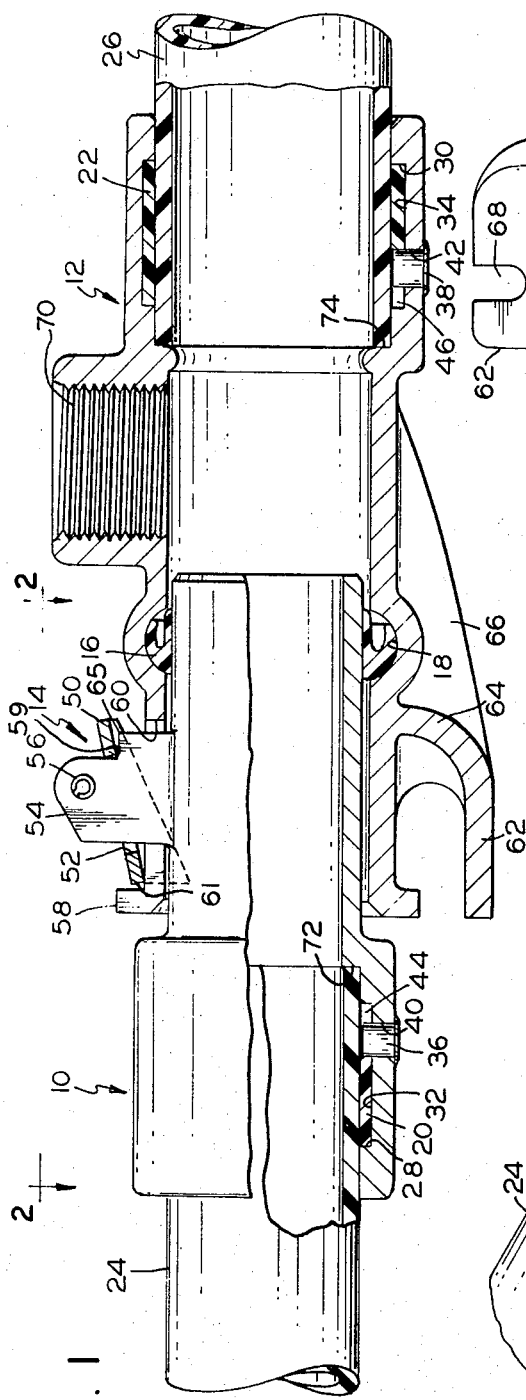
FIG. 1
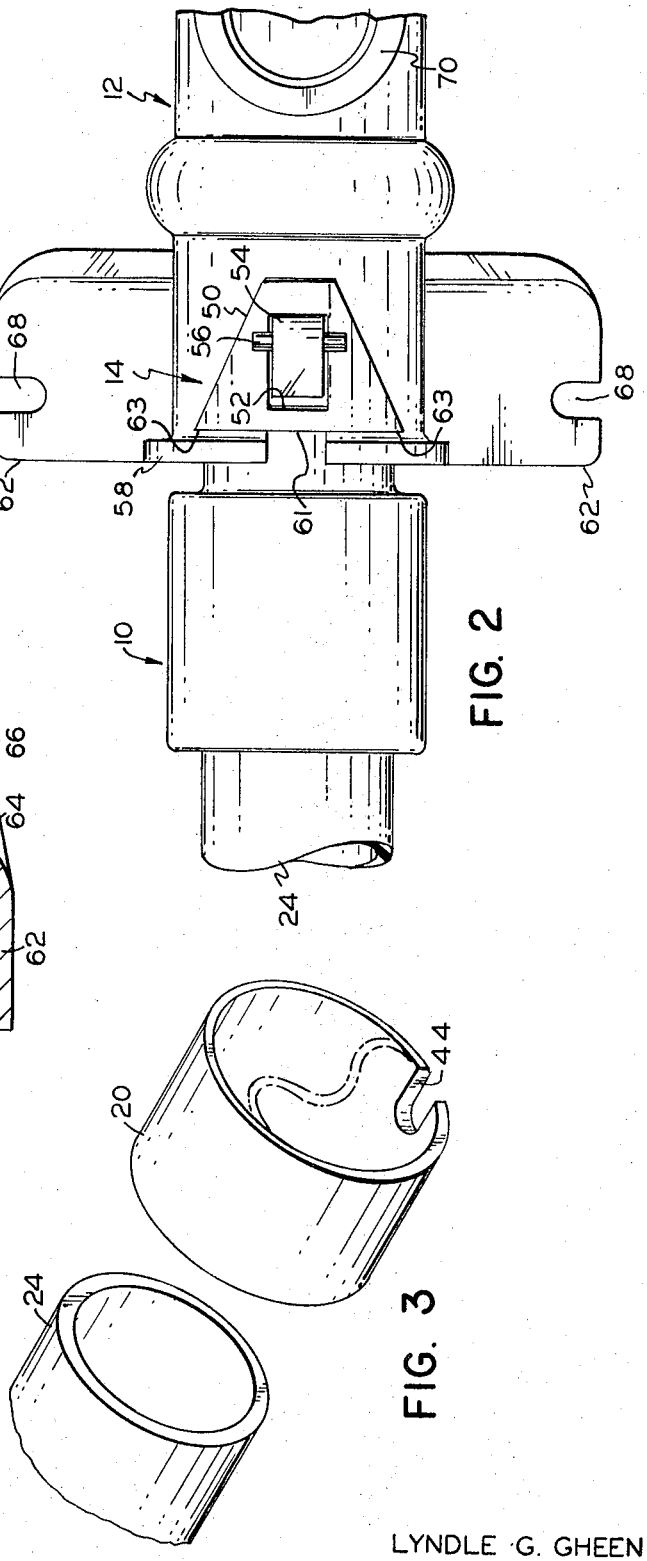
FIG. 2
FIG. 3
LYNDLE G. GHEEN
INVENTOR
BY
BUCKHORN, BLORE, KLARQUIST & SPARKMAN
ATTORNEYS

IRRIGATION COUPLING STRUCTURE

DESCRIPTION

This invention relates to an irrigation coupling structure and method of making the same, and more particularly to a joint between a plastic pipe and a coupler and method of making the same.

An object of the invention is to provide a new and improved irrigation coupling and method of making the same.

Another object of the invention is to provide a new and improved joint between a plastic pipe and a coupler and method of making the same.

A further object of the invention is to provide a joint between a plastic pipe and a coupling member in which the joint is sealed, keys the pipe to the member and secures the pipe to the member for tension.

Another object of the invention is to provide a simple, effective method of forming a joint between a plastic pipe and a coupling.

Another object of the invention is to provide a joint between a coupling and a plastic pipe which can be easily and surely made in the field.

The invention provides a joint between a plastic pipe and a coupling member including a sleeve of elastic sealing material slidable along a groove in the coupling member and adapted to seal against an end wall of the groove and cemented to the pipe, the sleeve having an opening therein receiving a keying element of the coupling. The invention also provides a method of forming a coupling structure wherein a flexible plastic sealing sleeve is collapsed, is inserted and reexpanded in an internal groove of a coupling member, an end portion of a pipe is fitted into the sleeve and is bonded thereto.

In the drawings:

FIG. 1 is a fragmentary, vertical sectional view of a coupler structure forming one embodiment of the invention;

FIG. 2 is a fragmentary top plan view of the coupler structure of FIG. 1; and

FIG. 3 is an exploded, perspective view of a portion of the coupler structure of FIG. 1.

Referring now in detail to the drawings, there is shown therein a coupling structure forming one embodiment of the invention and including a male coupling member 10 preferably of sand cast aluminum and a female coupling member 12 also preferably of sand cast aluminum. The members are secured together by a quickly operable latch mechanism 14. A seal 16 in an annular groove 18 seals the members 10 and 12 together, and resilient sealing sleeves 20 and 22 bonded to plastic pipes 24 and 26 are pressed by water pressure against annular flanges or rims 28 and 30 to form watertight seals with the members 10 and 12. The sleeves fit in annular grooves 32 and 34 in the members 10 and 12 sufficiently loosely to slide axially along the grooves 10 and 12 and press tightly against the flanges. Pins 36 and 38 fixed by riveting in holes 40 and 42 in the members project into the inner end portions of the grooves and into splining slots or notches 44 and 46 in the inner end portions of the sleeves.

The sleeves 20 and 22 are sufficiently flexible as to be easily folded or collapsed, as shown in broken lines in FIG. 3, to permit them to be inserted into the coupling members 10 and 12 (FIG. 1) and then expanded to fit into the annular grooves 32 and 34 with the splining slots 44 and 46 which key the sleeves to the coupling members while permitting the sleeves to move lengthwise along the coupling members and be pressed tightly by water pressure against the flanges 28 and 30 to completely seal the sleeves and the couplings against leakage of water. Preferably the outside diameters of the sleeves are, at about 70° F., each from .002 to .003 inch less than the diameter of the groove in which that sleeve fits. The sleeves are tough but are sufficiently soft that they conform well to the abutted surfaces of the flanges 28 and 30, and conform so well that complete sealing is effected even though the surfaces 28 and 30 are unfinished sand cast surfaces of the aluminum of the couplers. The sleeves also have the shear strength needed to withstand the normally encountered pressures of from 35 to 300 pounds per square inch.

After the sleeves have been inserted into the grooves 32 and 34, the inner surfaces of the sleeves and the outer surfaces of the end portions of the pipes 24 and 26 are coated with a solvent cement, and the end portions of the pipes are inserted into the sleeves and into engagement with shoulders 72 and 74 of the coupling members 10 and 12. The solvent of the cement then evaporates to leave the sleeves bonded very strongly to the end portions of the pipes. The above-described method of forming the joints is easily effected in the field.

Great difficulty was encountered in finding a material for the sleeves 20 and 22 which could be solvent welded or bonded strongly to the pipes 24 and 26 of polyvinyl chloride, could be injection molded or extruded, provide the necessary sealing or gasket quality, have the necessary shear strength and would not so weaken the polyvinyl chloride pipes to cause fracture points. After trying hundreds of unsatisfactory materials, it was found that one satisfactory material for the sleeves was a thermoplastic polyurethane soluble in the same solvents as the polyvinyl chloride of the pipes and containing 95 percent or more high molecular weight urethane polymer based on the constituents of methylenebisphenylene diisocyanate, polytetramethylene glycol and ethylene glycol. This material is available commercially as B. F. Goodrich Estane No. 58102. To make the compound set up and be stable when injection molded was found to be achievable by adding from 15 to 20 percent glass fibers to the polyurethane. The pipes 24 and 26 are of well known, commonly used, plasticizer free polyvinyl chloride material of 95 percent or more polyvinyl chloride resin and the remainder nonplasticizing ingredients including metallic complex stabilizers, external and internal lubricants, color pigments, inorganic fillers and polymeric impact modifiers. One very successful solvent cement comprised 75 parts by weight tetrahydrofuran, 15 parts by weight cyclohexanone and 10 parts by weight polyvinyl chloride suspension resin.

A latching plate 50 having a rectangular hole or slot 52 fits loosely on a platelike post 54 and is retained thereon by a roll pin 56. The slot is longer than the width of the upper portion of the post and the post has an elevated shoulder 59 on which the plate 50 rests, the shoulder being spaced radially outwardly from the coupling member 12 so that the plate 50 tilts inwardly by gravity to rest on the member 12 behind a flange 58 on the end of the member 12. The shoulder 59 is spaced radially outwardly beyond the flange 58 so that the coupling member 10 can be slid freely into the coupling member 12. The shoulder 59 and the post form a pivot for the plate 50. The plate 50 is generally of the shape of a truncated triangle and forms a portion of a cylinder substantially equal in diameter to the external diameter of the adjacent portion of the member 12. Forward end portion 61 of the plate 50 is concavely arcuate so that end portions 63 are spaced the same distance from the flange 58 as the central portion of the portion 61.

A base 62 of the member 12 keeps the coupling structure upright and has slots 68 and a flange 64, and a web 66 reinforces the base. The slots 68 are adapted to received bolts of a skid (not shown). The coupler 12 has a threaded coupling sleeve 70.

The slot 52 is longer than the width of the upper portion of the plate 54 but is shorter than the width of the upper portion of the plate plus the length of the shoulder 59 so that the plate 50 never slides over the shoulder. The portion of the plate 50 to the right of the slot 52, as viewed in FIG. 1, is longer than the length of the shoulder 59 so that when that end of the plate 50 is pressed by the finger of the user the plate engages corner 65 and is swung clockwise, as viewed in FIG. 1, so that its lefthand end is raised above the flange 58, and the members 10 and 12 may be pulled apart. As illustrated in FIG. 2, the portion of the plate 50 to the left of the right-hand end of the slot 52 is heavier than the portion of the plate 50 to the right of the slot 52. This causes the plate to always tend to be biased counterclockwise as viewed in FIG. 1 so that its left-hand end is above the flange 58 to permit the member 10 to be inserted into the member 12 without manipulation of the plate 50. This biasing of the plate also causes the right-hand end of the plate to normally rest on the portion of the member 12 behind the flange 58 to securely latch the member 10 to the member 12. Thus, the plate 50 is a ratchet-type latch permitting coupling without manipulation but requiring manual actuation for release.

I claim:

1. In an irrigation coupling structure, a coupling member having an interior annular groove having end walls, a sleeve of elastic sealing material slidable along the groove and adapted to seal at least against one of the end wall of the groove, and a pipe fitting closely in the sleeve and cemented thereto, the sleeve having an opening therein and the coupling member having a keying element projecting into the opening to key the sleeve to the coupling member.

2. The irrigation coupling structure of claim 1 wherein the opening is a splining slot.

3. The irrigation coupling structure of claim 2 wherein the keying element is a pin riveted in a hole in the coupling member.

4. The irrigation coupling structure of claim 2 wherein the slot is a notch at the inner end of the sleeve.

5. In a method of forming a coupling structure, transversely collapsing a flexible plastic sealing sleeve, inserting the collapsed sleeve into an internally grooved portion of a coupling member, reexpanding the sleeve to fit it into the groove, fitting an end portion of a pipe into the sleeve, and bonding the pipe to the sleeve.

6. The method of claim 5 wherein the bonding comprises applying cement to the interfitting portions of the sleeve and the pipe.